US008358980B2

(12) United States Patent
Tajima et al.

(10) Patent No.: US 8,358,980 B2
(45) Date of Patent: Jan. 22, 2013

(54) WIRELESS AUDIO TRANSFER SYSTEM, WIRELESS MICROPHONE, AUDIO TRANSMITTING APPARATUS, AUDIO RECEIVING APPARATUS, IMAGE PICKUP APPARATUS, RECORDING APPARATUS AND AUDIO MIXER

(75) Inventors: Iwao Tajima, Shizuoka (JP); Sinya Suzuki, Shizuoka (JP); Toshiyuki Yamaki, Shizuoka (JP)

(73) Assignee: Sony Corporation, Tokyo (JP)

( * ) Notice: Subject to any disclaimer, the term of this patent is extended or adjusted under 35 U.S.C. 154(b) by 1082 days.

(21) Appl. No.: 12/061,838

(22) Filed: Apr. 3, 2008

(65) Prior Publication Data

US 2008/0248755 A1 Oct. 9, 2008

(30) Foreign Application Priority Data

Apr. 5, 2007 (JP) ................................ P2007-099617

(51) Int. Cl.
*H04B 7/00* (2006.01)

(52) U.S. Cl. ........................ 455/66.1; 455/67.11; 381/58

(58) Field of Classification Search ................. 455/66.1; 381/58

See application file for complete search history.

(56) References Cited

U.S. PATENT DOCUMENTS 7,693,289 B2 * 4/2010 Stathem et al. ................. 381/58

FOREIGN PATENT DOCUMENTS

| | | |
|---|---|---|
| JP | 50-29116 | 3/1975 |
| JP | 6-113376 | 4/1994 |
| JP | 2001-289675 | 10/2001 |
| JP | 2002 9654 | 1/2002 |
| JP | 2002-78037 | 3/2002 |
| JP | 2002-135156 | 5/2002 |
| JP | 2003-92537 | 3/2003 |
| JP | 2003-316492 | 11/2003 |
| JP | 2006-54567 | 2/2006 |
| JP | 2007 36735 | 2/2007 |
| WO | WO 2005-006807 | 1/2005 |

* cited by examiner

*Primary Examiner* — Matthew Anderson
*Assistant Examiner* — Ganiyu A Hanidu
(74) *Attorney, Agent, or Firm* — Frommer Lawrence & Haug LLP; William S. Frommer; Thomas F. Presson

(57) ABSTRACT

Disclosed is a wireless audio transfer system that includes an audio transmitting apparatus including a microphone and a modulating/transmitting unit for transmitting radio waves modulated using an audio signal from the microphone, an audio receiving apparatus including a receiving/demodulating unit for receiving the radio waves and demodulating the audio signal, and an audio output terminal for outputting the audio signal demodulated by the receiving/demodulating unit. The system further includes an image pickup apparatus including an audio input terminal for inputting the audio signal. In the system, the audio transmitting apparatus includes a detecting unit for detecting distortion of an audio signal and a data transmitting unit for transmitting status data, the audio receiving apparatus includes a first communication terminal and a data processing unit for obtaining the status data from the received radio waves and outputting the status data from the first communication terminal, and the image pickup apparatus includes a second communication terminal for inputting the status data outputted from the first communication terminal, a display unit, and a first control unit for displaying whether audio distortion is present at the audio transmitting apparatus.

16 Claims, 15 Drawing Sheets

WIRELESS AUDIO TRANSFER SYSTEM, WIRELESS MICROPHONE, AUDIO TRANSMITTING APPARATUS, AUDIO RECEIVING APPARATUS, IMAGE PICKUP APPARATUS, RECORDING APPARATUS AND AUDIO MIXER

CROSS REFERENCES TO RELATED APPLICATIONS

The present invention contains subject matter related to Japanese Patent Application JP 2007-099617 filed in the Japanese Patent Office on Apr. 5, 2007, the entire contents of which being incorporated herein by reference.

BACKGROUND OF THE INVENTION

1. Field of the Invention

The invention relates to a system that uses a wireless microphone to transfer audio to an image pickup apparatus, a recording apparatus, or an audio mixer, and also relates to a wireless microphone, an audio transmitting apparatus, an audio receiving apparatus, an image pickup apparatus, a recording apparatus, and an audio mixer that construct such a system.

2. Description of the Related Art

In recent years, in the field of television broadcasting, it has become common to transfer audio using wireless microphones. FIGS. 1A and 1B show two examples of the appearance of a wireless microphone. Of such drawings, where FIG. 1A shows wireless microphone transmitters (hereinafter simply called “transmitters”) as apparatuses for transmitting audio. Each of the transmitters 81, 82 fundamentally includes a microphone (in the case of the transmitter 82, a pin microphone, not shown, that is connected by a cable) and a modulating/transmitting unit that transmits radio waves that have been modulated using an audio signal from the microphone. The transmitter 81 is a hand microphone-type transmitter that is held by hand. Conversely, the transmitter 82 is a device that is attached to a waist belt or the like.

FIG. 1B shows wireless microphone receivers (hereinafter simply called “receivers”) as apparatuses for receiving audio. The receivers 83, 84 each fundamentally include a receiving/demodulating unit that receives radio waves transmitted from the transmitter 81 or transmitter 82 and demodulates the audio signal, and an output terminal that outputs the demodulated audio signal to the outside. The receiver 83 is a portable receiver. The receiver 84 is a non-portable receiver and is capable of receiving radio waves from a plurality of transmitters (for example, four transmitters).

FIGS. 2A and 2B are diagrams showing examples of audio transfer systems that use the transmitter 81 and the receiver 83 shown in FIGS. 1A and 1B to record audio during ENG (Electronic News Gathering). In the example in FIG. 2A, the transmitter 81 is used by an announcer conducting an interview. The receiver 83 is attached to a slot provided on a camcorder 91 (i.e., a video camera integrated with a recorder such as a VTR or optical disk apparatus) or is connected to the camcorder 91 by a cable. The audio signal inputted from the receiver 83 into the camcorder 91 is recorded by the camcorder 91 together with the images shot by a cameraman (not shown) using the camcorder 91.

In the example in FIG. 2B, the transmitter 81 is used by an announcer and the receiver 83 is connected by a cable to an audio mixer 92. The audio signal inputted into the audio mixer 92 from the receiver 83 is mixed or switched by an audio man (not shown) using the audio mixer 92. The audio signal outputted from the audio mixer 92 is recorded by a VTR (or audio recorder or camcorder), not shown.

FIG. 3 shows an example of a system that uses a plurality of the transmitters 81, 82 and receivers 84 shown in FIG. 1 to transfer audio signals on multiple channels in a studio. The transmitters 81, 82 are used by the cast (not shown) or the like of a program. Radio waves transmitted from the transmitters 81, 82 are received by antennas 91 that are shared by the receivers 84. The audio signals on multiple channels outputted from the receivers 84 are sent to the audio mixer 92. Data on the audio signal levels and frequencies received by the respective receivers 84 are sent via a hub 93 to a personal computer 94. The frequency, audio signal level, and the like of the audio signal on each channel are displayed on the display of the personal computer 94.

However, when recording audio using such wireless microphones, if a large sound that exceeds the level that was expected when setting the input level of the transmitter (i.e., when setting the attenuation level of an attenuator) is inputted into the transmitter due to a large noise (such as the noise of a car) being unexpectedly produced in the periphery of the speaker, distortion of the audio signal occurs inside the transmitter.

An existing wireless microphone is constructed so that this type of audio distortion is detected inside the transmitter and displayed on a display unit (such as light-emitting diodes or a liquid crystal display) of the transmitter itself, so that the user can check for audio distortion by looking at the display unit.

Other existing methods include connecting headphones or speakers to the audio output terminal of the receiver and actually listening to the audio to check for audio distortion and looking at audio level meters on an audio mixer to check for audio distortion.

However, since a transmitter is small, the display area of the display unit is very small. When ENG (Electronic News Gathering) is carried out as shown in FIGS. 2A and 2B, in many cases the display unit is hidden by the announcer’s hand or clothes, and therefore will not be visible to the announcer. Also, for a system inside a studio such as that shown in FIG. 3, there are many cases where the transmitters and receivers are set up some distance away from each other, and it is generally difficult to see the display units of the transmitters from the positions of the receivers.

On the other hand, with the method where the user checks for audio distortion by actually listening to the audio, in addition to needing equipment such as headphones or speakers, special knowledge and experience are also required, with the reliance on human judgments also leading to inconsistencies in such judgments. When such equipment may not be provided and/or when the operator has insufficient knowledge or experience, the filmed material may not be used in some cases.

Also, with the method where audio distortion is checked by looking at audio level meters of an audio mixer, if the levels of the input audio signals inputted into the audio mixer are adjusted using auto-gain controls and/or variable volume controls (faders), the input audio levels of the transmitters themselves will not be displayed on the audio level meters, and therefore it may be to check for audio distortion at the transmitters. Accordingly, it may be necessary to change the settings of the audio mixer so that the input audio levels of the transmitters are displayed. Such settings will require knowledge and experience and are also troublesome.

In particular, when multiple transmitters are used to provide multiple channels as in the example shown in FIG. 3, it will need long time to specify the transmitter at which audio distortion has occurred.

For systems that use a wireless microphone, Japanese Unexamined Patent Application Publication No. 2007-36735 discloses a technology where the receiver detects frequencies unused by radio waves based on the reception level for radio waves and outputs information showing the detected unused frequencies from a communication connector (such information is inputted into a video camera or audio mixer into which the receiver inputs an audio signal and is displayed on a display unit). Consequently, the operator of the video camera or audio mixer can check the unused frequencies and set the frequencies to be used by the wireless microphone system.

SUMMARY OF THE INVENTION

However, the technology proposed by Patent Document 1 mentioned above only makes it possible to easily check the frequencies of radio waves that are unused by a receiver, and there has not been a technology that makes it easy to check for audio distortion at a transmitter from the position of the receiver.

Embodiments of the invention have attempted make it possible in a system that transfers audio using a wireless microphone, such as the examples shown in FIGS. 2A, 2B, and 3, to easily check whether audio distortion is present at a transmitter from the position of a receiver.

A wireless audio transfer system according to an embodiment of the invention includes:

an audio transmitting apparatus including a microphone and a modulating/transmitting unit for transmitting radio waves modulated using an audio signal from the microphone;

an audio receiving apparatus including a receiving/demodulating unit for receiving the radio waves transmitted from the audio transmitting apparatus and demodulating the audio signal and an audio output terminal for outputting the audio signal demodulated by the receiving/demodulating unit; and an image pickup apparatus including an audio input terminal for inputting the audio signal outputted from the audio receiving apparatus. In the wireless audio transfer system, the audio transmitting apparatus further includes a detecting unit for detecting distortion of an audio signal and a data transmitting unit for transmitting, as radio waves, status data showing a detection result of the detecting unit, the audio receiving apparatus further includes a first communication terminal and a data processing unit for obtaining the status data from the received radio waves and outputting the status data from the first communication terminal. Further, in the wireless audio transfer system, the image pickup apparatus includes a second communication terminal for inputting the status data outputted from the first communication terminal of the audio receiving apparatus, a display unit, and a first control unit for displaying, based on the status data inputted into the second communication terminal, whether audio distortion is present at the audio transmitting apparatus on the display unit.

Another wireless audio transfer system according to an embodiment of the invention includes:

an audio transmitting apparatus including a microphone and a modulating/transmitting unit for transmitting radio waves modulated using an audio signal from the microphone;

an audio receiving apparatus including a receiving/demodulating unit for receiving the radio waves transmitted from the audio transmitting apparatus and demodulating the audio signal and an audio output terminal for outputting the audio signal demodulated by the receiving/demodulating unit; and a recording apparatus including an audio input terminal for inputting the audio signal outputted from the audio receiving apparatus. In the wireless audio transfer system, the audio transmitting apparatus further includes a detecting unit for detecting distortion of an audio signal and a data transmitting unit for transmitting, as radio waves, status data showing a detection result of the detecting unit, and the audio receiving apparatus further includes a first communication terminal and a data processing unit for obtaining the status data from the received radio waves and outputting the status data from the first communication terminal. Moreover, in the wireless audio transfer system, the recording apparatus includes a second communication terminal for inputting the status data outputted from the first communication terminal of the audio receiving apparatus, a display unit, and a first control unit for displaying, based on the status data inputted into the second communication terminal, whether audio distortion is present at the audio transmitting apparatus on the display unit.

Another wireless audio transfer system according to an embodiment of the invention includes:

an audio transmitting apparatus including a microphone and a modulating/transmitting unit for transmitting radio waves modulated using an audio signal from the microphone;

an audio receiving apparatus including a receiving/demodulating unit for receiving the radio waves transmitted from the audio transmitting apparatus and demodulating the audio signal and an audio output terminal for outputting the audio signal demodulated by the receiving/demodulating unit; and an audio mixer including an audio input terminal for inputting the audio signal outputted from the audio receiving apparatus. In the wireless audio transfer system, the audio transmitting apparatus further includes a detecting unit for detecting distortion of an audio signal and a data transmitting unit for transmitting, as radio waves, status data showing a detection result of the detecting unit, and the audio receiving apparatus further includes a first communication terminal and a data processing unit for obtaining the status data from the received radio waves and outputting the status data from the first communication terminal. Moreover, in the wireless audio transfer system, the audio mixer includes a second communication terminal for inputting the status data outputted from the first communication terminal of the audio receiving apparatus, a display unit, and a first control unit for displaying, based on the status data inputted into the second communication terminal, whether audio distortion is present at the audio transmitting apparatus on the display unit.

Another wireless audio transfer system according to an embodiment of the invention includes:

a plurality of audio transmitting apparatuses that each include a microphone and a modulating/transmitting unit for transmitting radio waves modulated using an audio signal from the microphone;

at least one audio receiving apparatus including a receiving/demodulating unit for receiving the radio waves transmitted from at least one audio transmitting apparatus out of the plurality of audio transmitting apparatuses and demodulating the audio signals and at least one audio output terminal for outputting the audio signals demodulated by the receiving/demodulating unit; and a terminal apparatus connected to the at least one audio receiving apparatus. In the wireless audio transfer system, each audio transmitting apparatus further includes a detecting unit for detecting distortion of an audio signal and a data transmitting unit for transmitting, as radio waves, status data showing a detection result of the detecting unit, and each audio receiving apparatus further includes a data processing unit for obtaining the status data from the radio waves respectively received from the audio transmitting apparatuses and transmitting the status data to the terminal apparatus. Moreover, in the wireless audio transfer system, the terminal apparatus includes a display unit and a control unit for displaying a list of the status data of the audio transmitting apparatuses transmitted from the at least one audio receiving apparatus on the display unit.

An embodiment of the invention also includes a wireless microphone, audio transmitting apparatus, audio receiving apparatus, image pickup apparatus, recording apparatus, and audio mixer that construct any of the wireless audio transfer systems described above.

According to an embodiment of the invention, the audio transmitting apparatus (or "transmitter") that constructs a wireless microphone includes a data transmitting unit that transmits status data showing a detection result for audio distortion produced by a detecting unit inside the audio transmitting apparatus as radio waves.

In the audio receiving apparatus (or "receiver"), a data processing unit obtains the status data from the radio waves received from the audio transmitting apparatus and outputs the status data from a communication terminal.

In an image pickup apparatus, recording apparatus, or audio mixer in which an audio signal is inputted using this wireless microphone, status data from the audio receiving apparatus is inputted into a communication terminal. A control unit inside the image pickup apparatus, recording apparatus, or audio mixer displays the status data on a display unit provided on the image pickup apparatus, recording apparatus, or audio mixer.

In a multi-channel system where at least one audio receiving apparatus receives audio signals transmitted from a plurality of audio transmitting apparatuses, a data processing unit in the at least one audio receiving apparatus obtains status data from radio waves received from the plurality of audio transmitting apparatuses and such status data is transmitted to a terminal apparatus.

A control unit inside the terminal apparatus displays a list of the status data for the plurality of audio transmitting apparatuses transmitted from the at least one audio receiving apparatus on a display unit provided in the terminal apparatus.

In this way, the detection result for audio distortion inside an audio transmitting apparatus is transmitted as radio waves to an audio receiving apparatus and is displayed on a display unit of an image pickup apparatus, recording apparatus, or audio mixer into which an audio signal is inputted from the audio receiving apparatus, or is displayed on a display unit of a terminal apparatus connected to the audio receiving apparatus.

It may be possible to easily check the presence of audio distortion at the audio transmitting apparatus (or "transmitter") from the position of the audio receiving apparatus (or "receiver").

Even when multiple channels are used, a list of the detection results for audio distortion at the respective audio transmitting apparatuses is displayed on the display unit of a single terminal apparatus, and therefore it is possible to easily check at which audio transmitting apparatus audio distortion has occurred.

According to an embodiment of the invention, in a system that transfers audio using a wireless microphone, it may be possible to easily check for the presence of audio distortion at a transmitter from the position of the receiver.

Also, when utilizing a large number of channels by using a large number of transmitters, it is possible to easily check at which transmitters audio distortion has occurred.

DESCRIPTION OF THE PREFERRED EMBODIMENTS

Preferred embodiments of the invention will now be described in detail with reference to the attached drawings. Note that a system for inputting an audio signal from a wireless microphone into a video camera or audio mixer during ENG (Electronic News Gathering) and a system that uses a plurality of wireless microphones for transferring audio signals on a plurality of multiple channels in a studio will be described.

System for Inputting Audio Signals into a Video Camera

Figure 4:
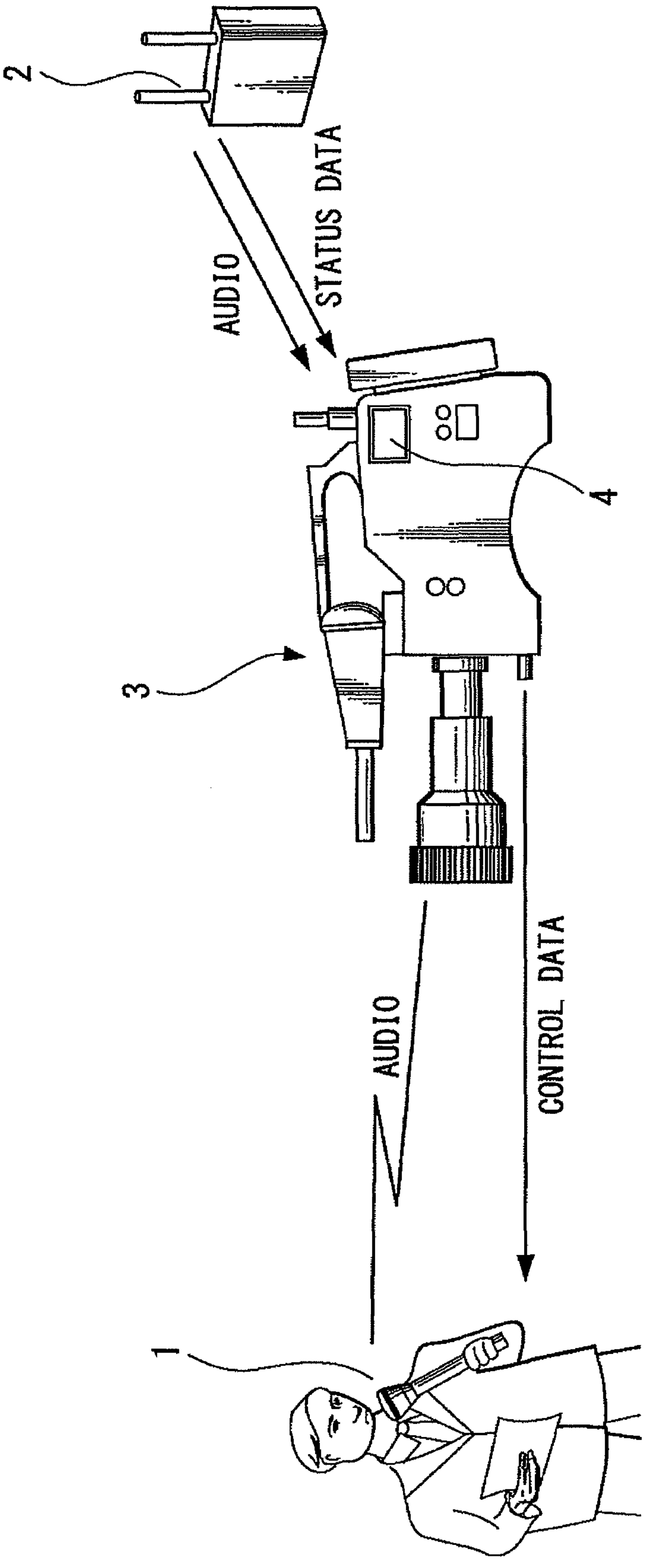
FIG. 4 is a view showing an example of an audio transfer system to which an embodiment of the invention has been applied.

FIG. 4 is a diagram showing one example of an audio transfer system to which an embodiment of the invention has been applied. This system inputs audio transferred using a wireless microphone into a camcorder (i.e., a video camera integrated with a recorder) in order to record audio during ENG.

Figure 1A:
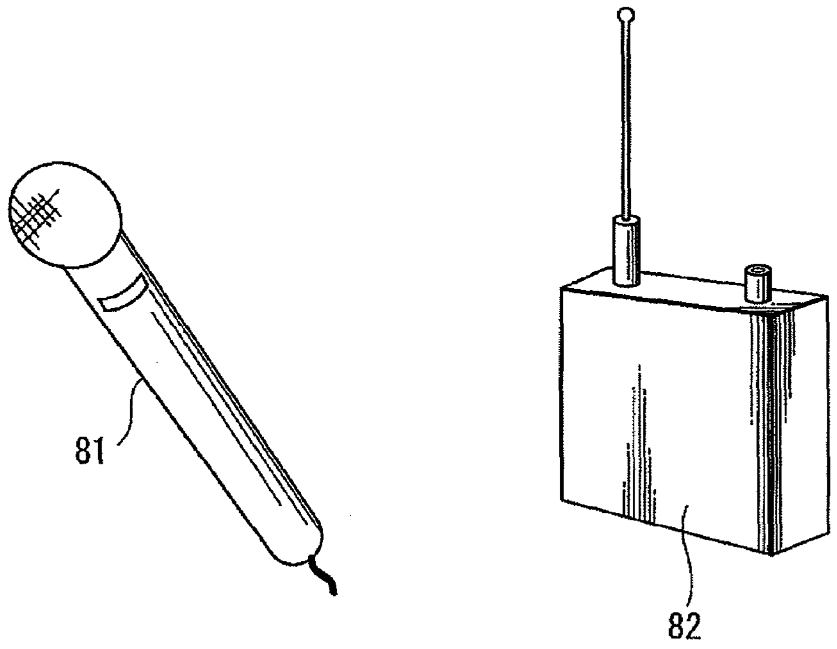
FIGS. 1A and 1B are views showing the appearance of two wireless microphones.
Figure 1B:
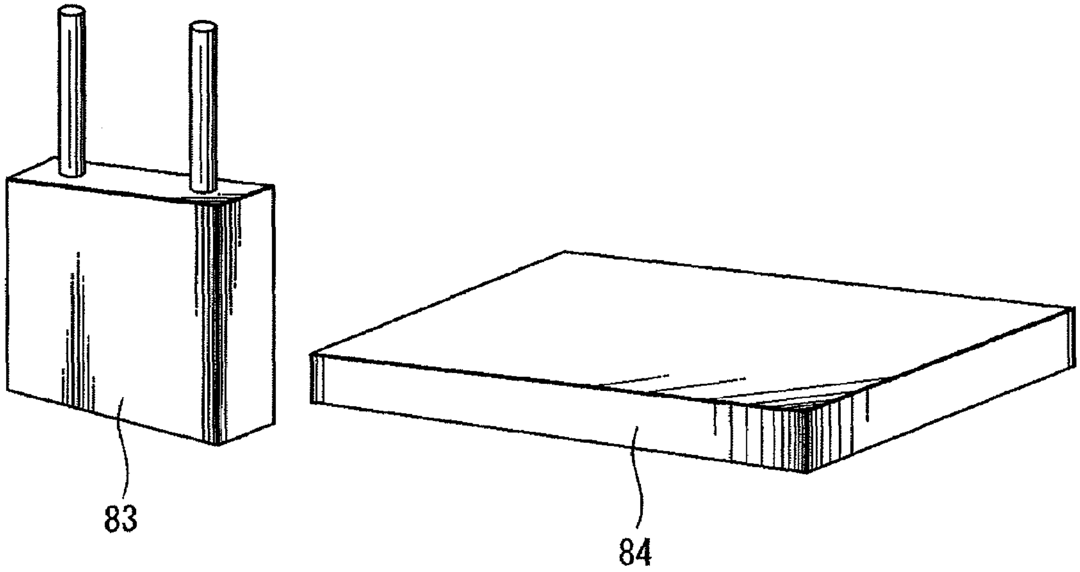
Figure 2A:
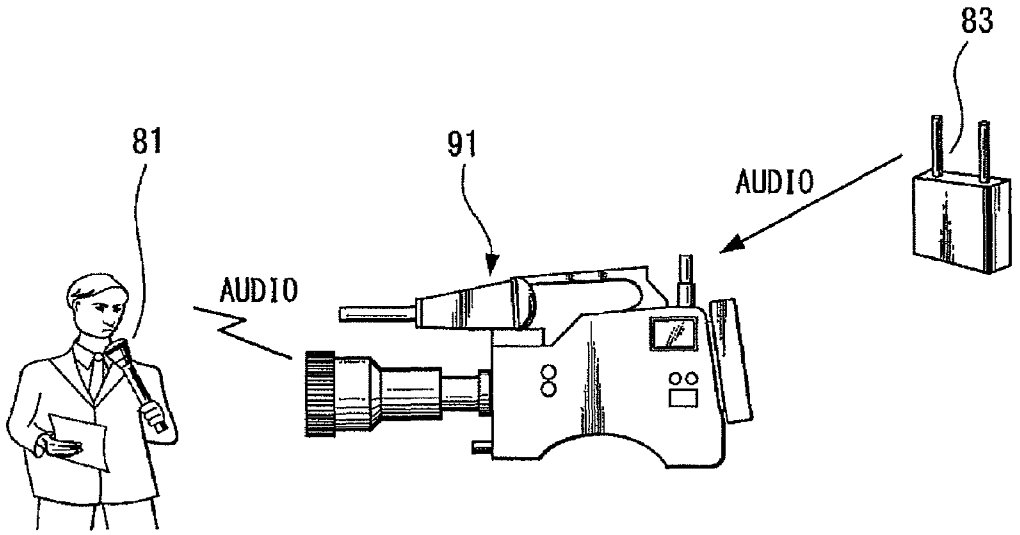
FIGS. 2A and 2B are views showing examples of ENG systems that use a wireless microphone.
Figure 2B:
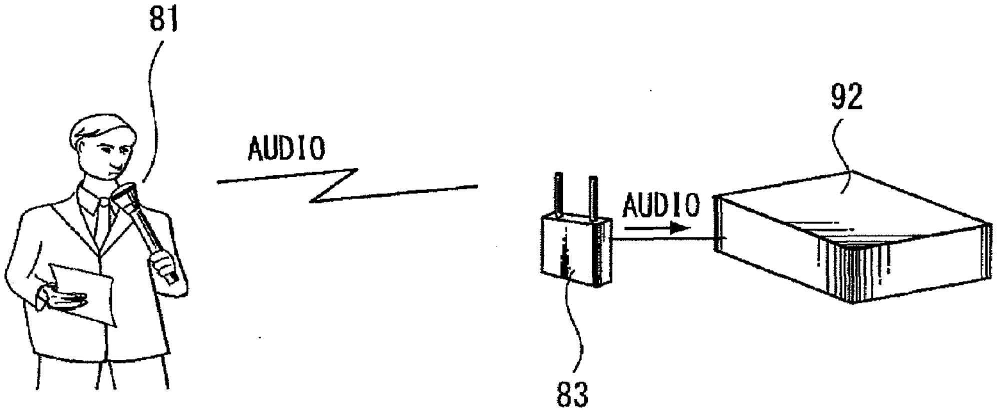
Figure 3:
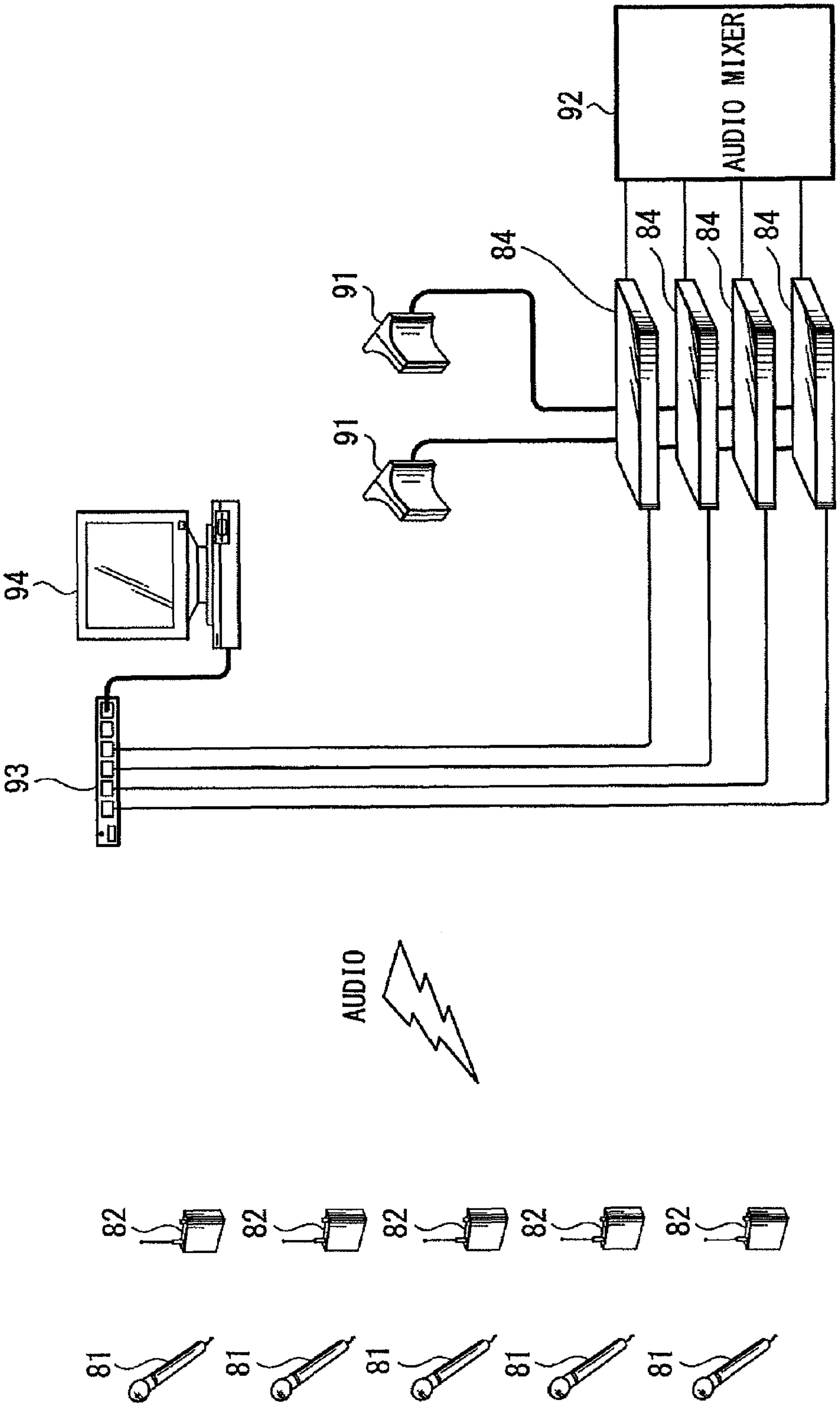
FIG. 3 is a view showing an example of a studio system that uses wireless microphones.

A wireless microphone transmitter (hereinafter simply called "transmitter") is used by an announcer conducting an interview. Although a hand microphone-type transmitter is shown as the transmitter 1 in FIG. 4, the transmitter 1 may be a device that is attached to a waist belt or the like (i.e., a device of the same form as the transmitter 82 shown in FIG. 1A).

The wireless microphone receiver (hereinafter, simply called "receiver") 2 is attached to a slot provided on a camcorder 3 (i.e., a video camera integrated with a recorder such as a VTR or optical disc apparatus), or alternatively may be attached to the camcorder 3 by a cable. The audio signal transferred to the receiver 2 from the transmitter 1 is inputted into the camcorder 3 from the receiver 2 and is recorded by the camcorder 3 together with images filmed by a cameraman (not shown) using the camcorder 3.

In this system, by looking at a viewfinder 4 of the camcorder 3, a cameraman who is filming images using the camcorder 3 can check for audio distortion at the transmitter 1. In addition, when there is audio distortion at the transmitter 1, the cameraman can operate an operation panel of the camcorder 3 to adjust the input audio level of the transmitter 1.

Next, the configurations of the transmitter 1 and the receiver 2 and the configuration of the camcorder 3 that make it possible to check for audio distortion according to this method will be described.

Figure 5:
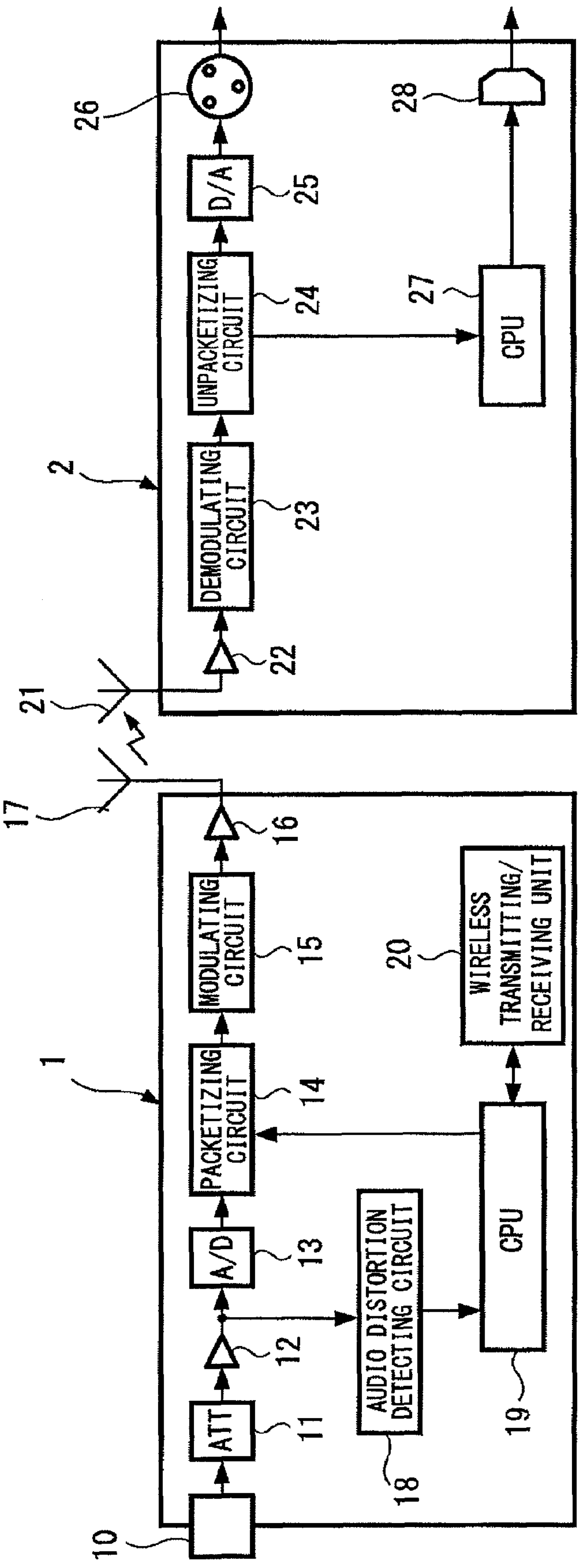
FIG. 5 is a block diagram showing an example configuration of a transmitter and a receiver shown in FIG. 4.

FIG. 5 is a block diagram that shows example configurations of the transmitter 1 and the receiver 2. The transmitter 1 includes a microphone 10, an ATT (attenuator) 11 for attenuating the level of the audio signal from the amp 10 so as to maintain a constant level, and an amp 12 for amplifying the audio signal from the A/D converter 11 to a desired level. When the transmitter 1 is attached to a waist belt or the like, the microphone 10 is a pin microphone connected by a cable. The attenuation level of the ATT 11 (for example, an attenuation level set in units of 3 dB such as 0 dB, −3 dB, −6 dB, . . . ) and the output level of the amp 12 are set by operating an operation unit (not shown) of the transmitter 1.

The transmitter 1 also includes an A/D converter 13 that carries out analog/digital conversion on an audio signal from the amp 12, a packetizing circuit 14 that converts the digital audio signal from the A/D converter 13 to packets, a modulating circuit 15 that transmits radio waves modulated using the packet signal outputted from the packetizing circuit 14, an amp 16, and a transmission antenna 17.

The transmitter 1 further includes an audio distortion detecting circuit 18, a CPU 19, and a wireless transmitting/receiving unit 20 that complies with Bluetooth standard.

The audio distortion detecting circuit 18 determines whether the level of the audio signal from the amp 12 exceeds a level set by the operation unit of the transmitter 1 to detect the presence of distortion of the audio signal of the transmitter 1. A signal showing a detection result is sent from the audio distortion detecting circuit 18 to the CPU 19.

A program that generates a packet signal appended with status data showing the detection result for audio distortion produced by the audio distortion detecting circuit 18 is stored in the CPU 19 as a program for controlling the packetizing circuit 14.

The receiver 2 includes a reception antenna 21, an amp 22, and a demodulating circuit 23 that receive the radio waves transmitted from the transmitter 1 and demodulate the packet signal, an unpacketizing circuit 24 that extracts the digital audio signal and the status data on audio distortion described above from the packet signal demodulated by the demodulating circuit 23, a D/A converter 25 that carries out digital/analog conversion on the digital audio signal extracted by the unpacketizing circuit 24, and an audio output terminal 26 for outputting an analog audio signal from the D/A converter 25.

The receiver 2 also includes a CPU 27 and a communication terminal 28 for serial communication.

The status data on audio distortion extracted by the unpacketizing circuit 24 is sent to the CPU 27. The CPU 27 outputs the status data on audio distortion from the communication terminal 28.

Figure 6:
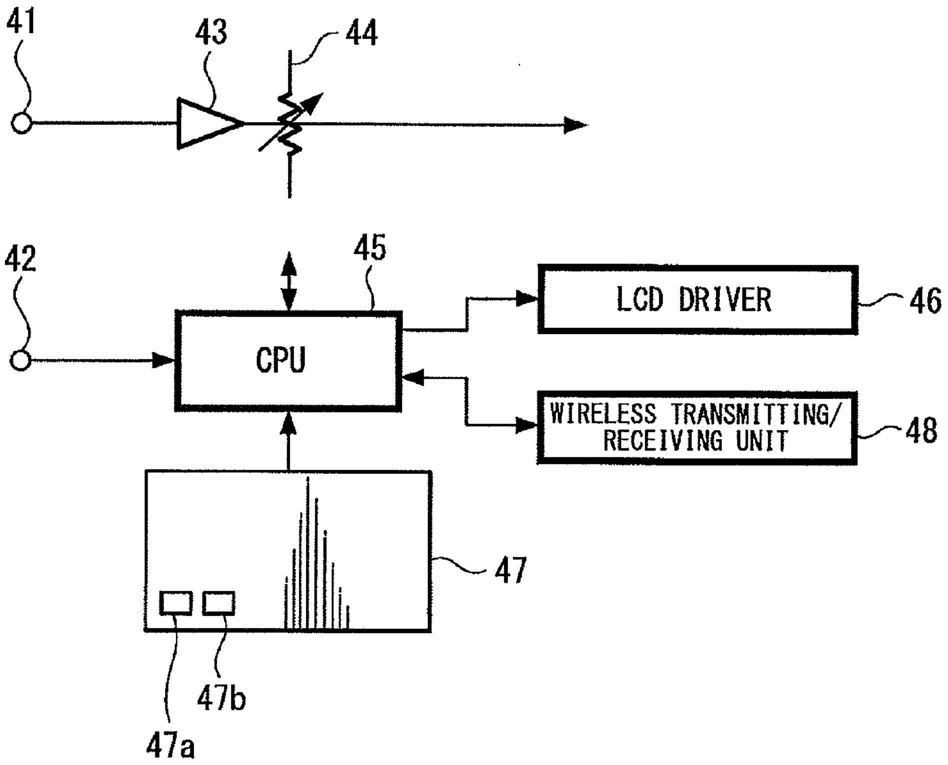
FIG. 6 is a block diagram showing a part of a video camera shown in FIG. 4 that relates to an embodiment of the invention.

In the camcorder 3 shown in FIG. 4, the image pickup system, image signal processing system, audio signal processing system, and recording/reproduction system have the same hardware configurations as in a standard camcorder. FIG. 6 is a block diagram showing only the parts relating to an embodiment of the invention out of the configuration of the camcorder 3.

The camcorder 3 is also equipped with an audio input terminal 41 for inputting an analog audio signal outputted from the audio output terminal 26 (shown in FIG. 5) of the receiver 2 and a communication terminal 42 for inputting data outputted from the communication terminal 28 (shown in FIG. 5) of the receiver 2.

After the level of the analog audio signal inputted into the audio input terminal 41 has been adjusted by an input amplifier 43 and a variable volume control 44 that form part of the audio signal processing system, processing is carried out by other circuits (not shown) of the audio signal processing system and then the analog audio signal is sent to the recording/reproduction system (not shown). The data inputted into the communication terminal 42 is sent to a CPU 45 for carrying out internal control of the camcorder 3.

Based on the status data on audio distortion described above that has been sent from the communication terminal 42, the CPU 45 controls an LCD driver 46 (a circuit for driving an LCD display that constructs the viewfinder 4 shown in FIG. 4) to display whether audio distortion is present at the transmitter 1 on the viewfinder 4.

Figure 7:
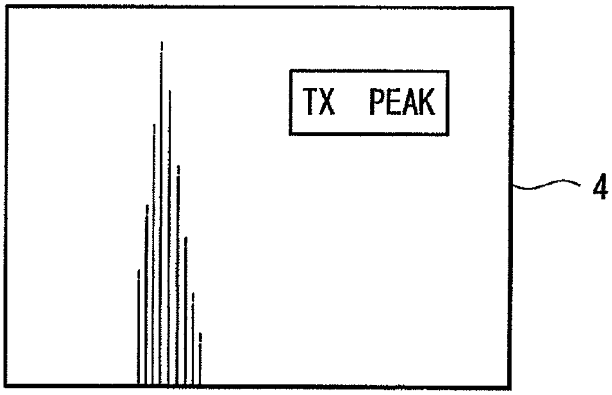
FIG. 7 is a view showing an example display of whether audio distortion is present at the transmitter on a viewfinder of the video camera shown in FIG. 4.

FIG. 7 is a diagram showing an example display of whether audio distortion is present at the transmitter 1 on the viewfinder 4. When audio distortion is present, as shown in FIG. 7, an indicator composed of the letters “TX PEAK” (where “TX” means “transmitter”) is displayed in one corner of the screen where images are displayed during image pickup. On the other hand, when no audio distortion is present, such indicator is not displayed.

As shown in FIG. 6, an adjustment button 47*a* for adjusting the attenuation level of the ATT 11 (see FIG. 5) in the transmitter 1 (i.e., for changing the input level of the audio signal into the transmitter 1) for example in 3 dB units such as 0 dB, −3 dB, −6 dB, . . . is provided on an operation panel 47 of the camcorder 3. In addition, a setting button 47*b* for setting the correspondence between the attenuation level set by the adjustment button 47*a* and an adjustment of the variable volume control 44 inside the camcorder 3 (for example, correspondence showing the number of dB by which the variable volume control 44 will raise the audio level when the audio level has been lowered by 3 dB at the ATT 11) is also provided on the operation panel 47.

The camcorder 3 also includes a wireless transmitting/receiving unit 48 that complies with Bluetooth standard.

When the adjustment button 47*a* has been operated, the CPU 45 transmits control data showing such operation from the wireless transmitting/receiving unit 48 to the wireless transmitting/receiving unit 20 (see FIG. 5) of the transmitter 1.

The CPU 19 (see FIG. 5) of the transmitter 1 controls the attenuation level of the ATT 11 (see FIG. 5) based on the control data received by the wireless transmitting/receiving unit 20.

Similarly, when a setting has been made using the setting button 47*b*, the CPU 45 controls the variable volume control 44 in response to the adjustment button 47*a* having been operated and based on the setting made using the setting button 47*b*.

In the system shown in FIG. 4, status data showing the detection result for audio distortion inside the transmitter 1 is transmitted from the transmitter 1 as radio waves.

In the receiver 2, the status data is obtained from the radio waves received from the transmitter 1 and such status data is outputted from the communication terminal 28.

In the camcorder 3, based on the status data inputted from the receiver 2 into the communication terminal 42, the CPU 45 displays whether audio distortion is present at the transmitter 1 on the viewfinder 4.

By looking at the display of the viewfinder 4 of the camcorder 3, a cameraman positioned at the receiver 2 can easily check whether audio distortion is present at the transmitter 1.

Accordingly, when audio distortion occurs at the transmitter 1 due to the speaker's voice being unexpectedly loud or a large noise (such as the sound of a car) being produced in the periphery, it is possible to immediately know that audio distortion has occurred without equipment, such as headphones or speakers, and knowledge and experience as in the related art, so that the cameraman can then tell the announcer to temporarily stop the interview or indicate that the speaker should be further away from the transmitter 1, for example.

If the adjustment button 47*a* of the operation panel 47 of the camcorder 3 is operated, control data showing such operation is wirelessly transmitted from the camcorder 3 to the transmitter 1 and the attenuation level of the ATT 11 inside the transmitter 1 is controlled based on such data.

Accordingly, it is also possible for the cameraman to immediately eliminate the audio distortion of the transmitter 1 and continue recording at a favorable audio level without having the announcer using the transmitter 1 interrupt the interview.

Figure 8:
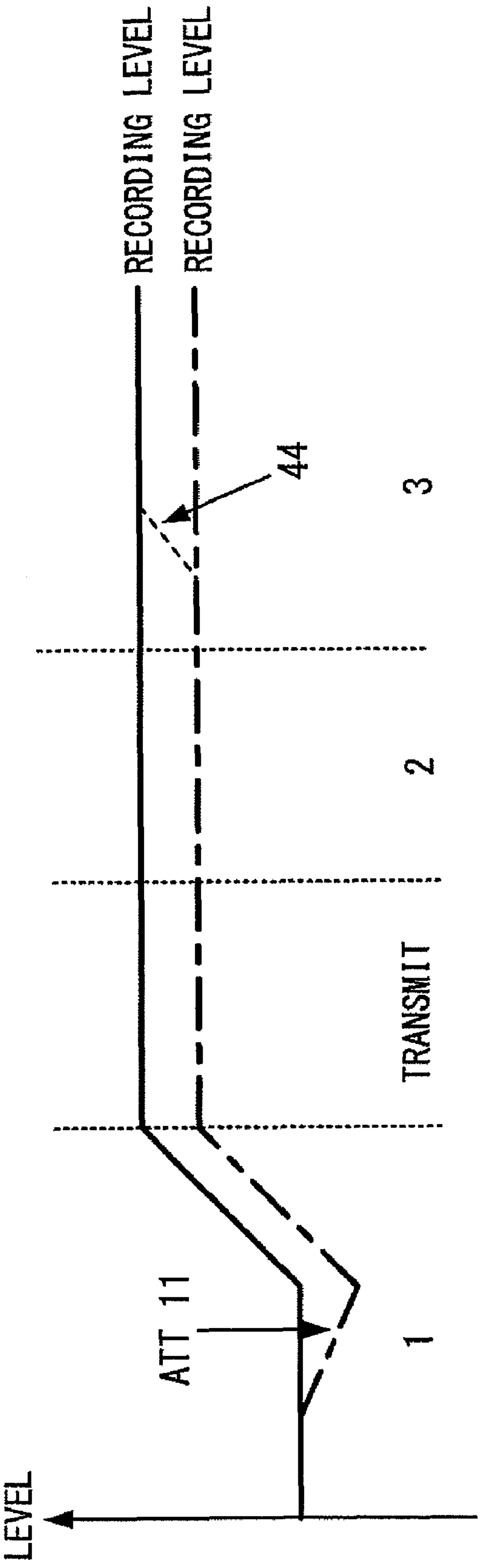
FIG. 8 is a graph showing a recording level of a video camera according to control by a CPU shown in FIG. 6.

In addition, by making a setting using the setting button 47*b* of the operation panel 47, it is possible to eliminate audio distortion at the transmitter 1 without causing variation in the recording level of the camcorder 3. This will now be described with reference to FIG. 8. FIG. 8 shows the relationship between the attenuation level of the ATT 11 inside the transmitter 1, the adjustment to the level of the variable volume control 44 inside the camcorder 3, and the recording level of the camcorder 3, with the audio signal levels shown on the vertical axis.

In FIG. 8, the recording level when the attenuation level of the ATT 11 is 0 dB is shown by the solid line, and an audio level for the case where the attenuation level of the ATT 11 has increased from 0 dB is shown by a dot-dash line. From FIG. 8, it can be seen that when the attenuation level of the ATT 11 has been increased to eliminate audio distortion at the transmitter 1, without further adjustment, the recording level at the camcorder 3 will fall.

On the other hand, as shown by the dashed line in FIG. 8, if the audio level is raised at the variable volume control 44 in concert with the increase in the attenuation level of the ATT 11, it will be possible to eliminate the audio distortion at the transmitter 1 without causing variation in the recording level.

In addition, if a setting is made in advance via the setting button 47*b* of the operation panel 47, control over the variable volume control 44 will be carried out automatically together with control of the ATT 11. By doing so, it will be possible to prevent variation in the recording level without having to carry out a troublesome operation, such as operating operation buttons of the variable volume control 44 at the same time as operating the adjustment button 47*a*.

System for Inputting Audio Signals into an Audio Mixer

Figure 9:
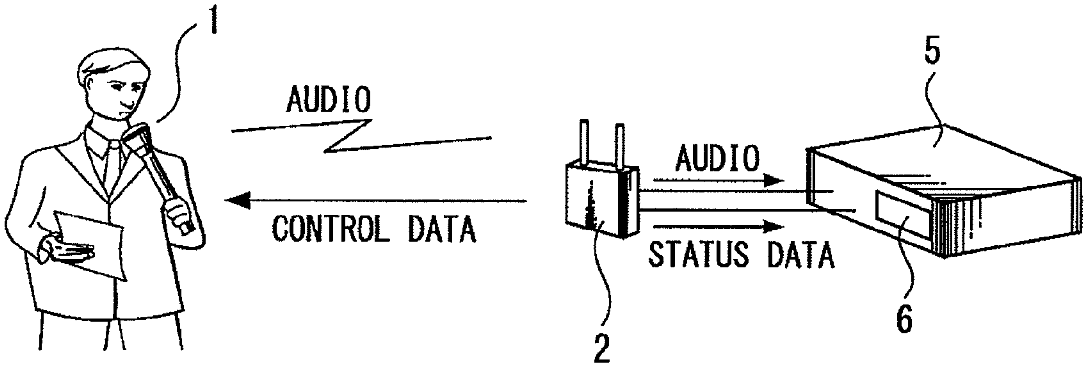
FIG. 9 is a view showing another example of an audio transfer system to which an embodiment of the invention has been applied.

FIG. 9 is a diagram showing another example of an audio transfer system to which an embodiment of the invention has been applied. In this system, to record audio during ENG, audio transferred using a wireless microphone is inputted into an audio mixer.

In this system, since the transmitter 1 and the receiver 2 have the same configurations (see FIG. 5) as in the system shown in FIG. 4, the same reference numerals have been assigned as in FIG. 4.

The transmitter 1 is used by an announcer who is conducting an interview. The receiver 2 is connected to an audio mixer 5 by a cable. The audio signal inputted from the receiver 2 into the audio mixer 5 is mixed or switched by an audio man (not shown) operating the audio mixer 5. The audio signal outputted from the audio mixer 5 is recorded by a VTR (or audio recorder or camcorder), not shown.

In this system, the audio man who operates the audio mixer 5 looks at a display unit 6 on the surface of the case of the audio mixer 5 to check whether audio distortion is present at the transmitter 1. In addition, when audio distortion has occurred at the transmitter 1, the audio man can adjust the input audio level of the transmitter 1 by operating the operation panel of the audio mixer 5.

Figure 10:
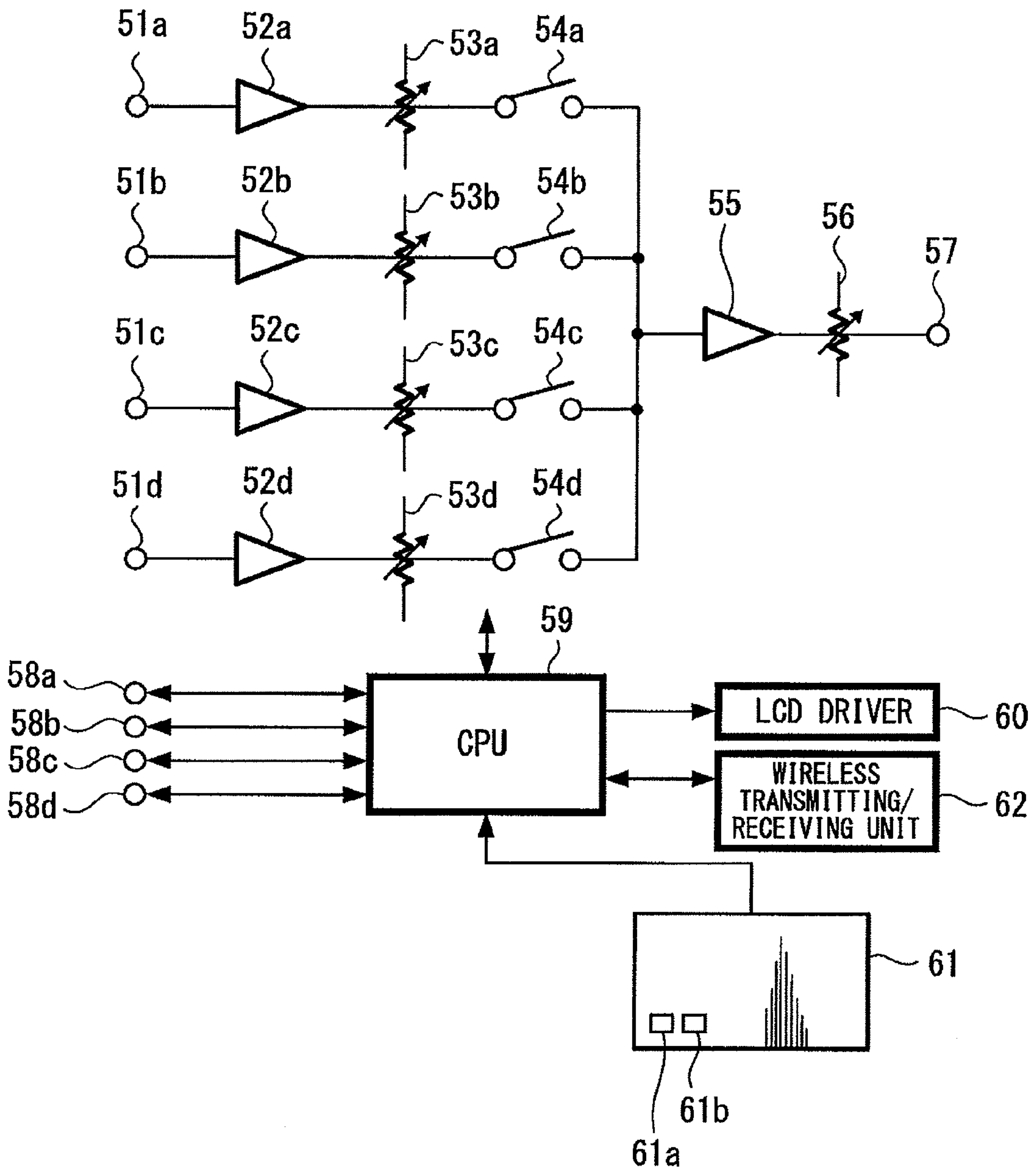
FIG. 10 is a block diagram showing the overall configuration of an audio mixer shown in FIG. 9.

FIG. 10 is a block diagram showing the overall configuration of the audio mixer 5 that makes it possible to check for audio distortion using this method. The audio mixer 5 is an audio mixer that can mix audio signals on four channels and is provided with four audio input terminals 51*a* to 51*d*.

Audio signals inputted into the audio input terminals 51*a* to 51*d* are supplied to a mixing amp 55 via amps 52*a* to 52*d*, variable volume controls (faders) 53*a* to 53*d*, and switches 54*a* to 54*d* that can be switched on or off. The output audio signal from the mixing amp 55 is outputted via a variable volume control 56 from an audio output terminal 57.

On the audio mixer 5, serial communication terminals 58*a* to 58*d* of the same specification as the communication terminal 28 (see FIG. 5) of the receiver 2 are provided so as to correspond one-to-one with the four audio input terminals 51*a* to 51*d*.

The audio output terminal 26 and communication terminal 28 (see FIG. 5) of the receiver 2 are connected to a corresponding audio input terminal and communication terminal out of the audio input terminals 51*a* to 51*d* and communication terminals 58*a* to 58*d* by cables (for example, when the audio output terminal 26 is connected to the audio input terminal 51*a*, the communication terminal 28 is connected to the communication terminal 58*a*).

The data inputted into the communication terminals 58*a* to 58*d* is sent to a CPU 59 that carries out internal control of the audio mixer 5.

When the status data on audio distortion described earlier is sent from any of the communication terminals 58*a* to 58*d*, based on such status data, the CPU 59 controls an LCD driver 60 (i.e., a circuit that drives an LCD display that constructs the display unit 6 in FIG. 9) to display whether audio distortion is present at the transmitter 1 on the display unit 6.

Figure 11:
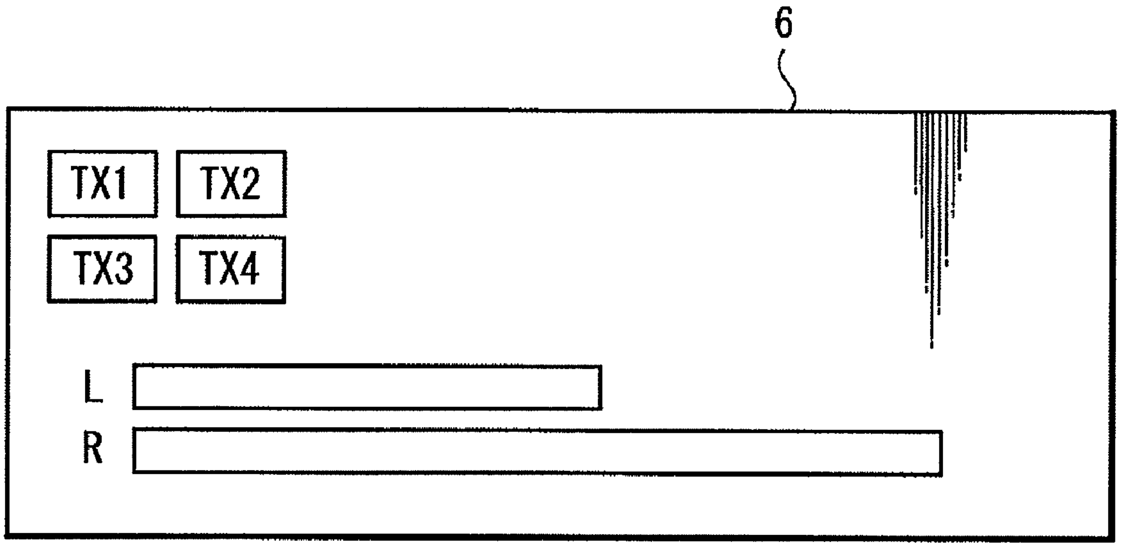
FIG. 11 is a view showing an example display of whether audio distortion is present at respective transmitters on a display unit on the audio mixer shown in FIG. 9.

FIG. 11 is a diagram showing an example display of whether audio distortion is present on the display unit 6. On the display unit 6, indicators composed of the characters "TX1" to "TX4" that correspond one-to-one with the audio input terminals 51*a* to 51*d* are normally displayed darkly (i.e., the indicators are not lit up) above a display position of an audio level meter. When status data showing audio distortion is inputted into the communication terminal 58*a*, for example, the indicator "TX1" corresponding to the audio input terminal 51*a* is brightly lit on the display.

As shown in FIG. 10, an adjustment button 61*a* for adjusting the attenuation level of the ATT 11 (see FIG. 5) of the transmitter 1 for example in units of 3 dB such as 0 dB, −3 dB, −6 dB, . . . is provided on the operation panel 61 of the audio mixer 5. In addition, a setting button 61*b* for setting the correspondence between the attenuation level set by the adjustment button 61*a* and an adjustment of variable volume controls 53*a* to 53*d* in the audio mixer 5 is provided on the operation panel 61. These buttons 61*a*, 61*b* have the same functions as the adjustment button 47*a* and the setting button 47*b* on the operation panel 47 of the camcorder 3 shown in FIG. 6.

The audio mixer 5 also includes a wireless transmitting/receiving unit 62 that complies to Bluetooth standard.

When the adjustment button 61*a* is operated, the CPU 59 transmits control data showing such operation from the wireless transmitting/receiving unit 62 to the wireless transmitting/receiving unit 20 (see FIG. 5) of the transmitter 1.

As described earlier, the CPU 19 (see FIG. 5) of the transmitter 1 controls the attenuation level of the ATT 11 (see FIG. 5) based on the control data showing the operation received by the wireless transmitting/receiving unit 20.

When a setting has been made using the setting button 61*b*, the CPU 59 controls the variable volume control, out of the variable volume controls 53*a* to 53*d*, that has been supplied with an audio signal from the receiver 2 (for example, when the audio signal is inputted from the receiver 2 into the audio input terminal 51*a*, the variable volume control 53*a*) in response to the adjustment button 61*a* having been operated and based on the setting made using the setting button 61*b*.

In the system shown in FIG. 9, the status data showing the detection result for audio distortion inside the transmitter 1 is transmitted as radio waves from the transmitter 1.

In the receiver 2, the status data is obtained from the radio waves received from the transmitter 1 and is outputted from the communication terminal 28 (see FIG. 5).

In the audio mixer 5, based on the status data inputted from the receiver 2, the CPU 59 displays whether audio distortion is present at the transmitter 1 on the display unit 6.

By looking at the display unit 6 of the audio mixer 5, the audio man positioned at the receiver 2 can easily check whether audio distortion is present at the transmitter 1.

If the adjustment button 61*a* of the operation panel 61 of the audio mixer 5 is operated when audio distortion has occurred at the transmitter 1, control data showing such operation is wirelessly transmitted from the audio mixer 5 to the transmitter 1 and the attenuation level of the ATT 11 (see FIG. 5) in the transmitter 1 is controlled based on such data.

Accordingly, it becomes possible for the audio man to immediately eliminate the audio distortion at the transmitter 1 and continue recording at a favorable audio level without having the announcer using the transmitter 1 interrupt the interview.

In addition, by making a setting using the setting button 61*b* of the operation panel 61, it is possible to eliminate the audio distortion at the transmitter 1 without causing variation in the input level of the audio mixer 5.

Note that in the system shown in FIG. 4 and FIG. 9, the attenuation level of the ATT 11 inside the transmitter 1 is controlled by operating the operation panel 47 (see FIG. 6) of the camcorder 3 or operating the operation panel 61 (see FIG. 10) of the audio mixer 5. However, as a different example, it is also possible to control the attenuation level of the ATT 11 inside the transmitter 1 by operating an operation unit provided on the surface of the cover of the receiver 2 (in this case, the camcorder 3 and the audio mixer 5 merely display the presence of audio distortion).

Figure 12:
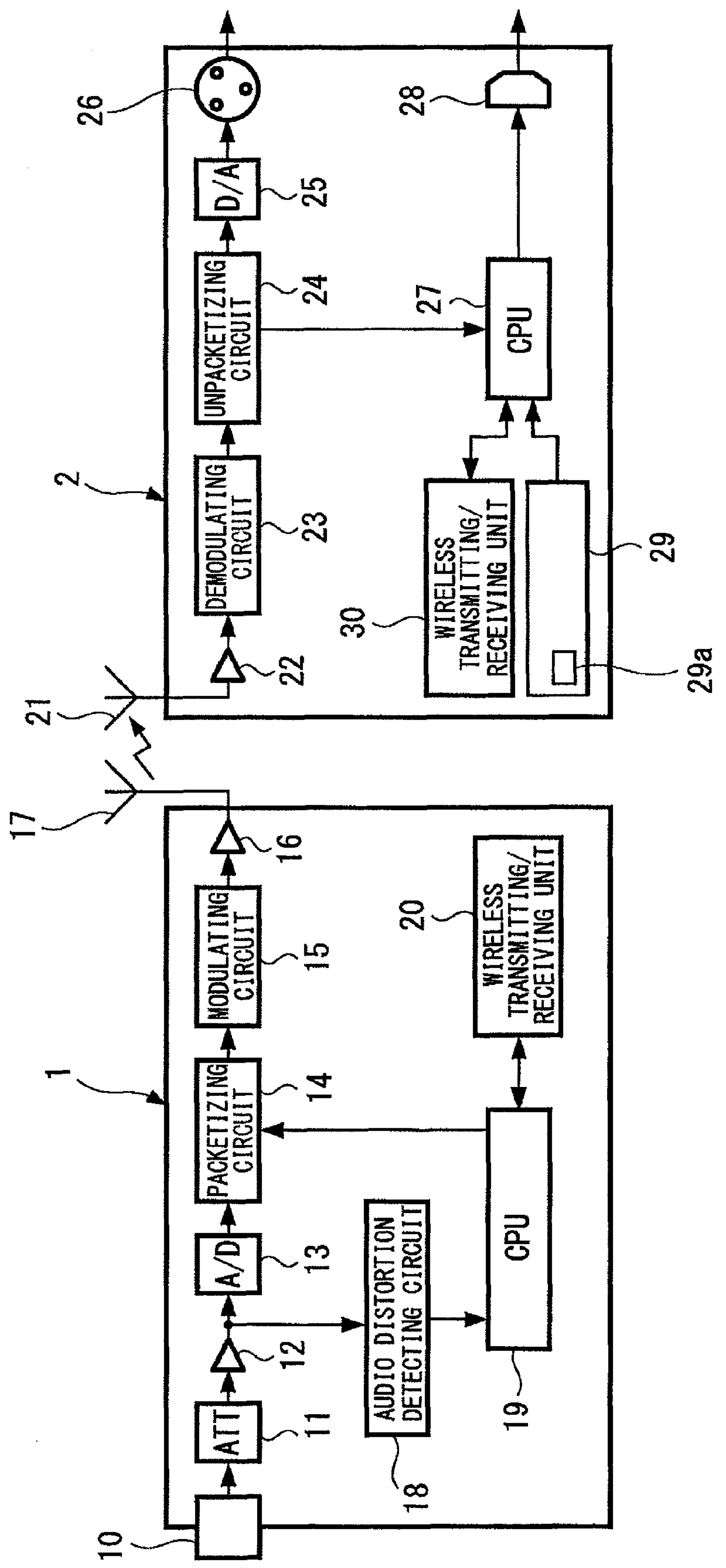
FIG. 12 is a block diagram showing another example configuration of the receiver shown in FIG. 4.

FIG. 12 is a block diagram showing the configuration of the receiver 2 in this case along with the transmitter 1. Parts that are the same as in FIG. 5 have been assigned the same reference numerals and duplicated description thereof has been omitted. In this example, an adjustment button 29*a* for adjusting the attenuation level of the ATT 11 of the transmitter 1 for example in units of 3 dB such as 0 dB, −3 dB, −6 dB, . . . is provided on an operation unit 29 of the receiver 2. The adjustment button 29*a* has the same function as the adjustment button 47*a* of the operation panel 47 of the camcorder 3 shown in FIG. 6.

The receiver 2 also includes a wireless transmitting/receiving unit 30 that complies with Bluetooth standard.

When the adjustment button 29*a* is operated, the CPU 27 transmits control data showing such operation from the wireless transmitting/receiving unit 30 to the wireless transmitting/receiving unit 20 of the transmitter 1.

Since the receiver 2 is positioned close to the camcorder 3 or the audio mixer 5, even if the operation unit 29 of the receiver 2 is operated as in this example, the cameraman or audio man will still be able to immediately eliminate the audio distortion at the transmitter 1.

As yet another example, although an operation that controls the attenuation level of the ATT 11 inside the transmitter 1 is carried out on the operation panel 47 (see FIG. 6) of the camcorder 3 or the operation panel 61 (see FIG. 10) of the audio mixer 5, the wireless transmission and reception of the control data showing such operation may be carried out between the receiver 2 and the transmitter 1.

Figure 13:
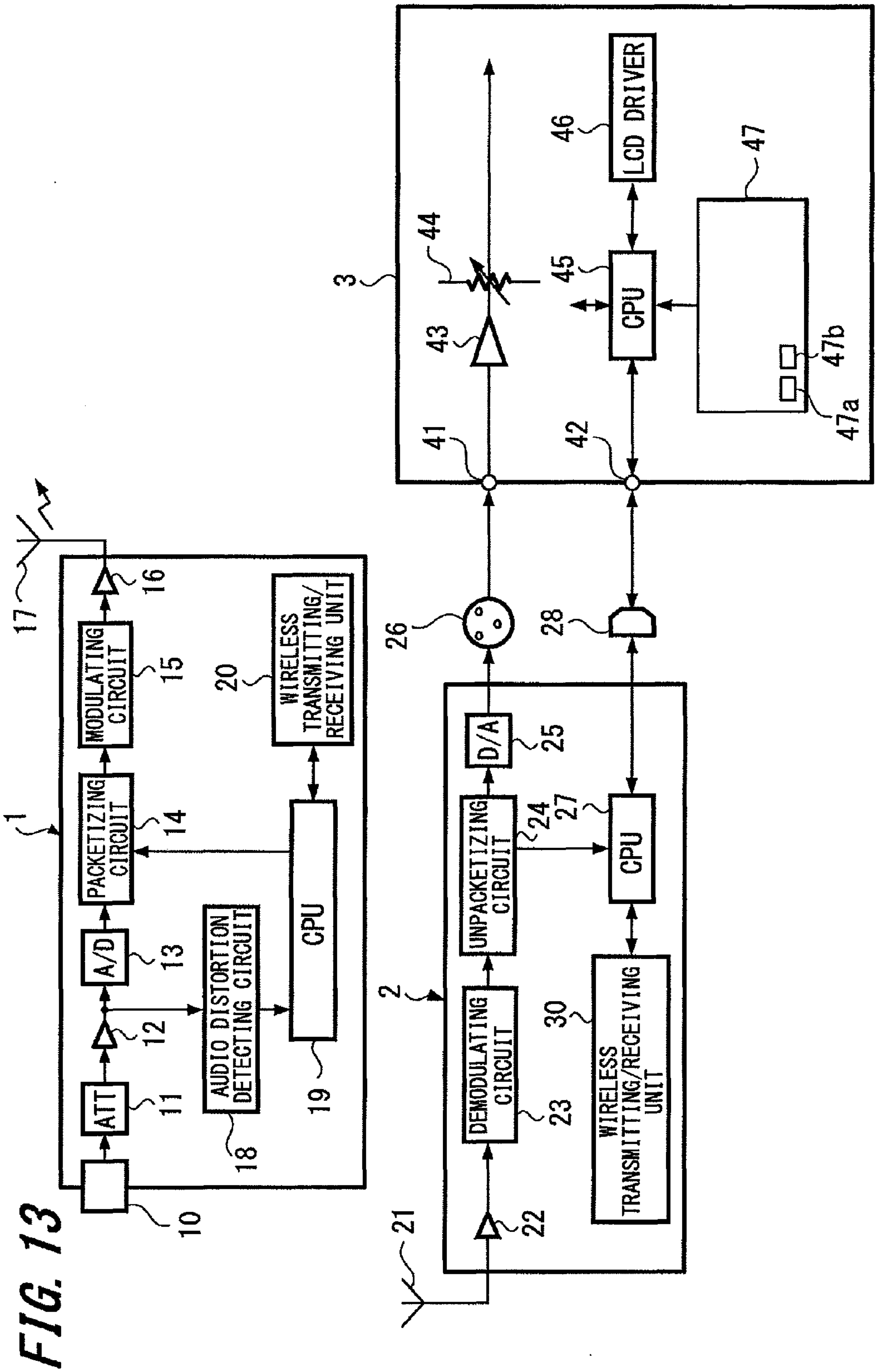
FIG. 13 is a block diagram showing other example configurations of the receiver and the video camera shown in FIG. 4.

FIG. 13 is a block diagram showing the configurations of the receiver 2 and the camcorder 3 in this case along with the transmitter 1 for the example system shown in FIG. 4. Parts that are the same as in FIG. 12 and FIG. 6 have been assigned the same reference numerals and duplicated description thereof has been omitted. In this example, the camcorder 3 is not provided with a wireless transmitting/receiving unit (i.e., the wireless transmitting/receiving unit 48 shown in FIG. 6) and the CPU 45 outputs control data showing the operation of the adjustment button 47*a* from the communication terminal 42 to the receiver 2.

The operation unit of the receiver 2 is not provided with a button (for example, the adjustment button 29*a* shown in FIG. 12) for adjusting the attenuation level of the ATT 11 of the transmitter 1 (the operation unit itself is omitted from FIG. 13). The CPU 27 of the receiver 2 transmits the control data inputted from the camcorder 3 into the communication terminal 28 from the wireless transmitting/receiving unit 30 to the wireless transmitting/receiving unit 20 of the transmitter 1.

Although FIG. 13 shows the same example system as FIG. 4, in the system shown in FIG. 9, in the audio mixer 5, the CPU 59 may output control data showing an operation of the adjustment button 61*a* to the receiver 2 from a communication terminal, out of the communication terminals 58*a* to 58*d*, that is connected to the receiver 2, with the control data being wirelessly transmitted and received between the receiver 2 and the transmitter 1 in the same way as described above.

As yet another example, a dedicated remote controller including a wireless transmitting/receiving unit that complies to Bluetooth standard and an adjustment button for adjusting the attenuation level of the ATT 11 of the transmitter 1 may be provided, with such remote controller being operated by a cameraman or audio man.

The method used for the communication between the camcorder 3 or audio mixer 5 (or the receiver 2 or the dedicated remote controller) and the transmitter 1 is not limited to a Bluetooth-compliant method, and it is possible to use another suitable wireless communication method (such as infrared communication).

System for Transferring Audio Signals on Multiple Channels in a Studio

Figure 14:
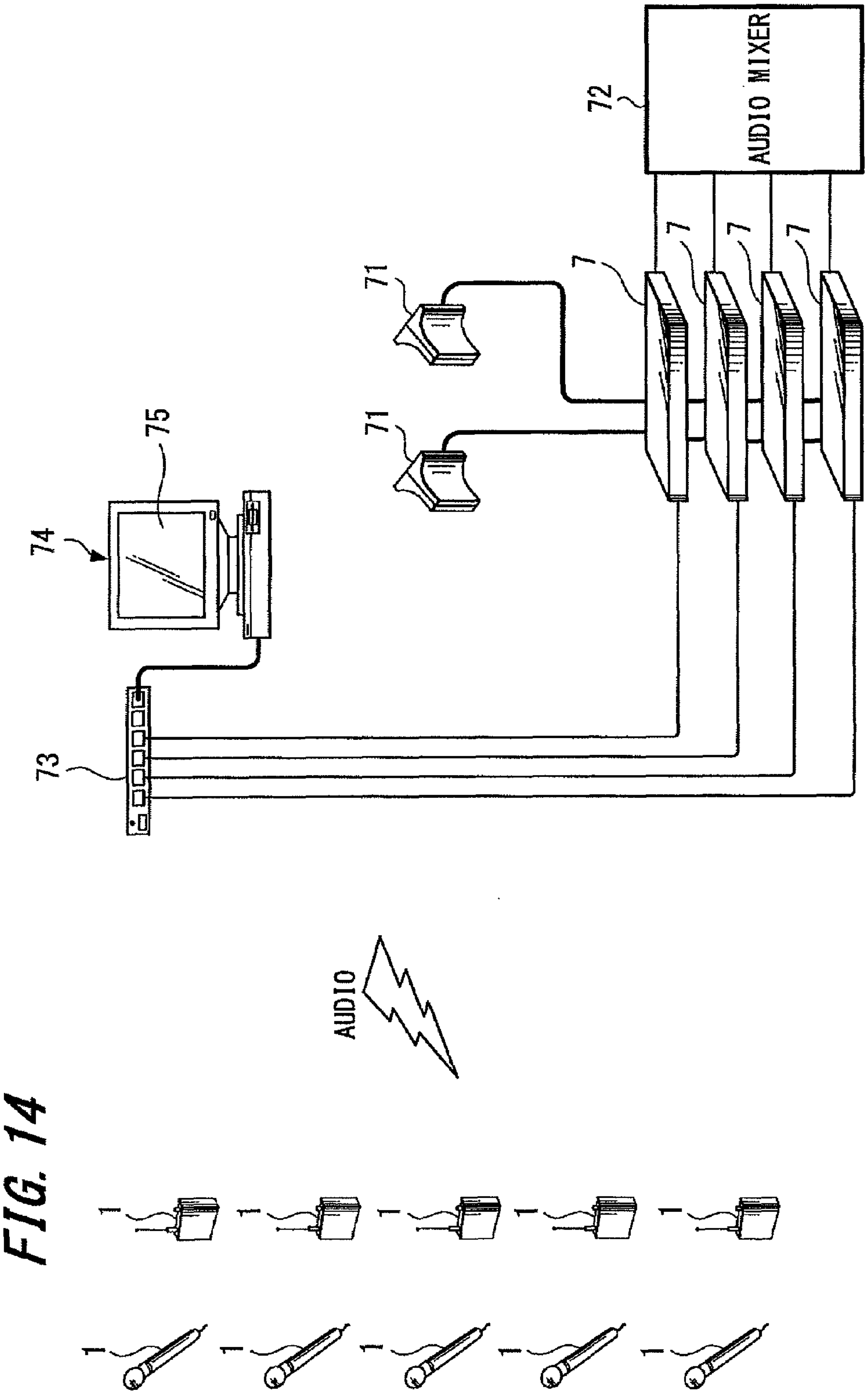
FIG. 14 is a diagram showing another example of an audio transfer system to which an embodiment of the invention has been applied.

FIG. 14 shows another example of an audio transfer system to which an embodiment of the invention has been applied.

This system uses a plurality of wireless microphones to transfer audio signals on multiple channels in a studio.

In this system, the transmitters 1 include both hand-microphone-type transmitters and transmitters that are attached to a waist-belt or the like. Since the internal configurations are the same as the configuration (see FIG. 5) of the transmitter 1 used in the system shown in FIG. 4, the same reference numerals are assigned as in FIG. 4.

Each transmitter 1 is used by a cast member (not shown) or the like. The radio waves transmitted from the transmitters 1 are received by the antennas 71 that are shared by four wireless microphone receivers (hereinafter simply called "receivers") 7.

Figure 15:
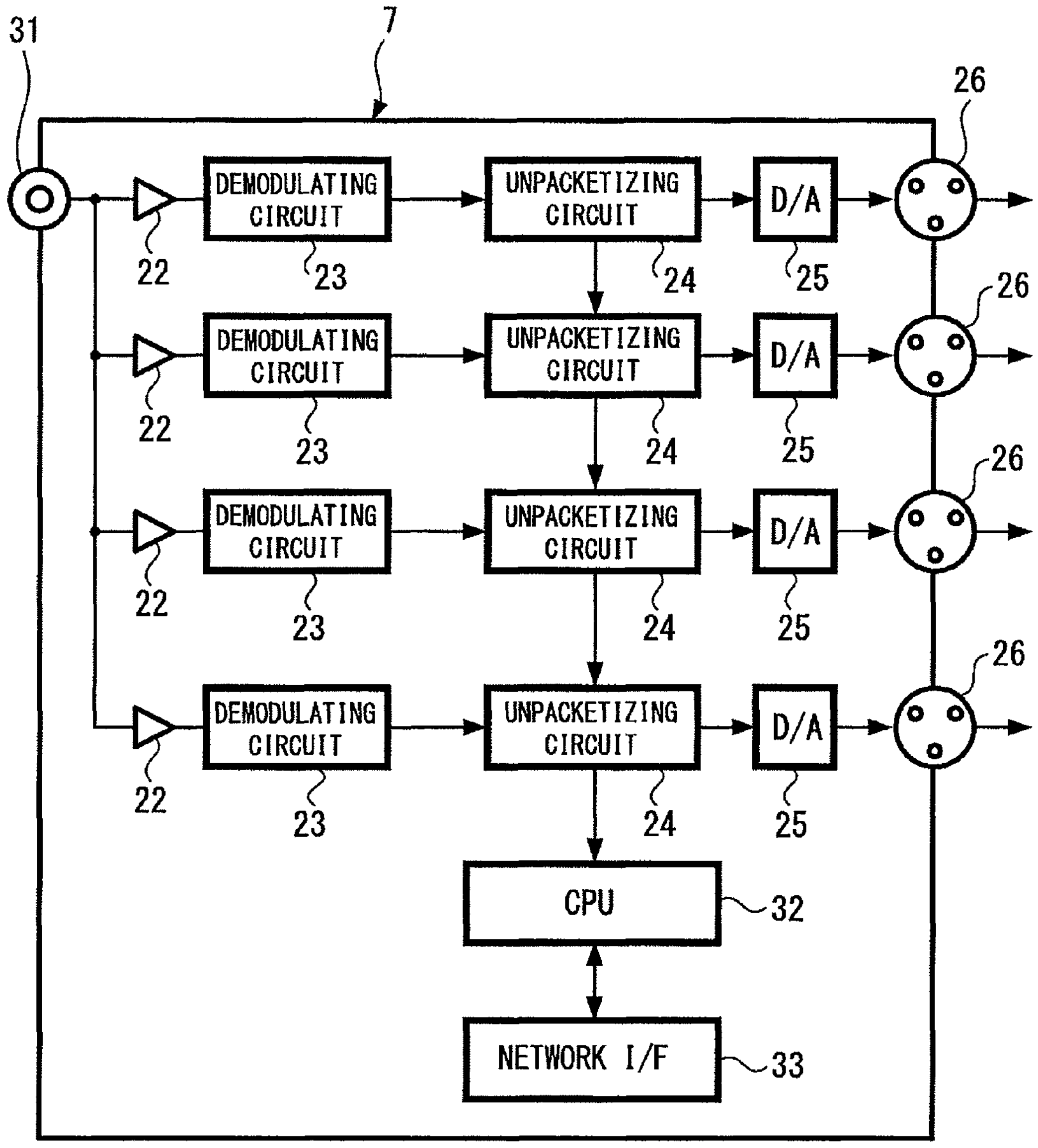
FIG. 15 is a block diagram showing an example configuration of a receiver shown in FIG. 14.

Each receiver 7 is a non-portable receiver and is capable of demodulating four channels of audio signals from four transmitters. FIG. 15 is a block diagram showing an example configuration of each receiver 7. Parts that are the same as the receiver 2 shown in FIG. 5 are assigned the same reference numerals and duplicated description thereof has been omitted.

The receiver 7 includes an antenna input terminal 31 connected to the antennas 71 in FIG. 14, four subsystems that are each composed of an amp 22 to an audio output terminal 26 and respectively correspond to radio waves on four channels received by the antennas 71, a CPU 32, and a network interface 33.

The audio signals outputted from the respective audio output terminals 26 are transmitted to an audio mixer 72 in FIG. 14.

Status data on audio distortion detected by the unpacketizing circuit 24 in each subsystem is sent to the CPU 32. The CPU 32 transmits information relating to the audio signal on each channel received by the receiver 7 (information on the frequency, audio output level, and the like) from a network interface 33 via a hub 73 shown in FIG. 14 to a personal computer 74. Here, the CPU 32 transmits status data on audio distortion from the unpacketizing circuit 24 in each subsystem as one type of such information.

In the personal computer 74 in FIG. 14, information for monitoring the audio signal on each channel (such as the frequency and audio output level of the audio signal) is displayed in a list on a display 75 based on the information transmitted from each receiver 7 via the hub 73. As one example of such information, a list showing whether audio distortion is present at the transmitter 1 of each channel is displayed.

Figure 16:
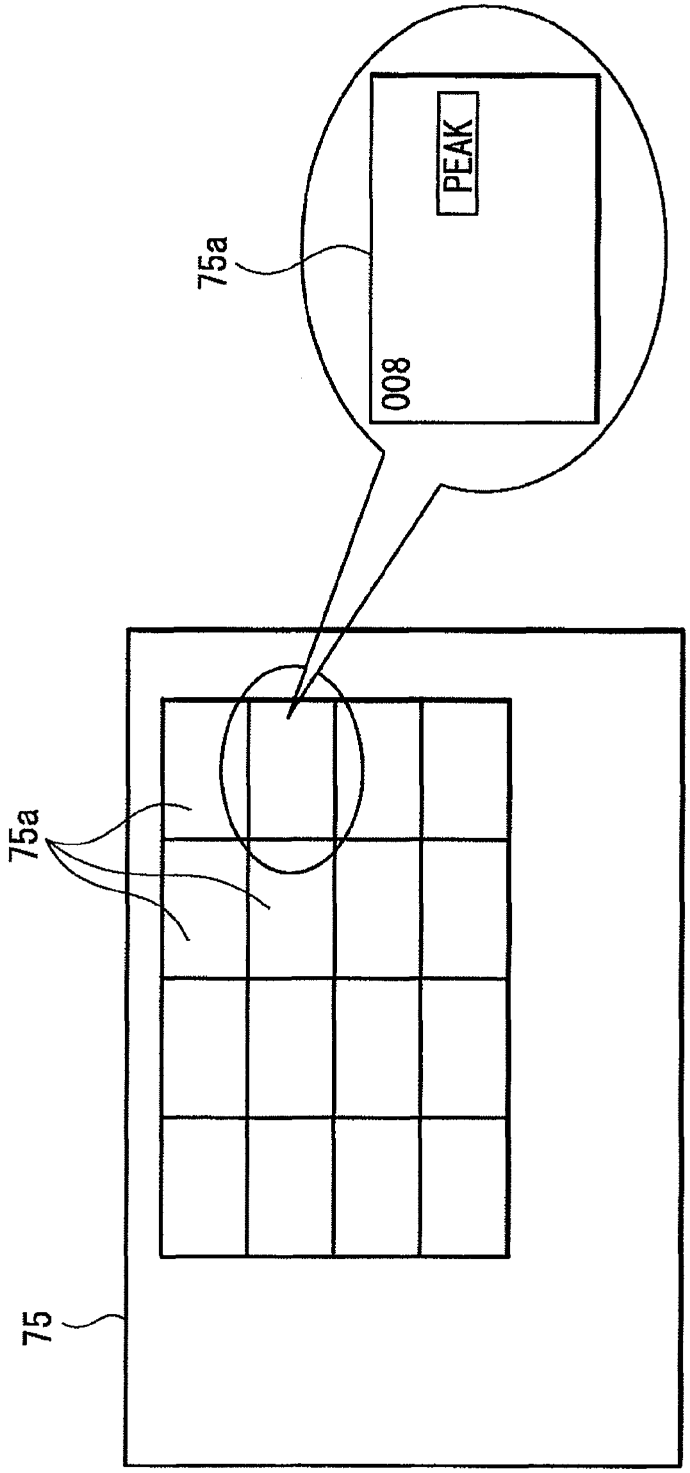
FIG. 16 is a view showing an example display on a personal computer shown in FIG. 14 of whether audio distortion is present at respective transmitters.

FIG. 16 is a view showing an example display of whether audio distortion is present on the display 75 of the personal computer 74. Monitoring display areas 75*a* are individually assigned to the audio signals of each channel, and out of such display areas 75*a*, an indicator composed of the characters "PEAK" is displayed in one corner of the display area 75*a* for a channel on which audio distortion has occurred at the transmitter 1 (in FIG. 16 the display area 75*a* with the channel number "008"). On the other hand, such indicator is not displayed in the display areas 75*a* for channels on which audio distortion has not occurred.

In the system shown in FIG. 14, the status data showing the detection result for audio distortion inside the transmitter 1 is transmitted as radio waves from the transmitter 1.

In the receiver 7, status data is obtained from the radio waves received from each transmitter 1 and the status data is transmitted to the personal computer 74.

In the personal computer 74, a list showing whether audio distortion is present at each transmitter 1 is displayed on the display 75 based on the status data transmitted from the receivers 7.

The audio man (not shown) positioned at the receiver 7 can easily check whether audio distortion is present at the respective transmitters 1 by looking at the display 75 of the personal computer 74.

Thus, when utilizing a large number of channels by using a large number of transmitters 1, it is possible to easily check at which transmitters 1 audio distortion is present.

In this system also, in the same way as the receiver 2 with the configuration shown in FIG. 12, if the receiver 7 includes an adjustment button for adjusting the attenuation level of the ATT 11 of the transmitter 1 (and a designating button for designating the transmitter 1 of an arbitrary channel out of the plurality of channels) and a wireless transmitting/receiving unit, it will be possible for an audio man positioned at the receiver 7 to eliminate audio distortion at a transmitter 1 for which the presence of audio distortion has been discovered by looking at the display of the display 75.

Note that in the above description, a packet signal where status data showing the presence of audio distortion is appended to the audio signal is transmitted as radio waves from the transmitter 1. However, as another example, status data showing the presence of audio distortion may be transmitted from the transmitter 1 as a subcarrier of a different frequency band to the main carrier, the main carrier being the radio waves used to transmit the audio signal, and the receiver 2 may obtain the status data on the presence of audio distortion by receiving and demodulating the subcarrier.

Also, in the above description, an embodiment of the invention is applied to the transmitter 1 and the receiver 2 that transfer digital audio signals. However, the embodiment of the invention can be applied regardless of whether audio signals are transferred as digital signals or audio signals.

When an embodiment of the invention is applied to a transmitter and a receiver that transfer audio signals as analog signals, as one example, in the transmitter, status data showing the detection result for audio distortion produced by an audio distortion detecting circuit (such as the audio distortion detecting circuit 5 shown in FIG. 5) may be superimposed on an analog audio signal as a tone signal of a frequency outside the audible spectrum and in the receiver, the status data may be obtained by detecting the tone signal from the demodulated analog audio signal.

Alternatively, status data on audio distortion may be transmitted from the transmitter using a subcarrier of a different frequency band to the main carrier, the main carrier being the radio waves used to transmit an analog audio signal, and the receiver 2 may obtain the status data by receiving and demodulating the subcarrier.

Also, in the description given above, a system that inputs an audio signal into a camcorder is shown in FIG. 4. However, an embodiment of the invention may also be applied to displaying whether audio distortion is present at a transmitter on a display unit of an image pickup apparatus in a system where an audio signal is inputted into an image pickup apparatus that does not have a function for recording images and audio. The embodiment of the invention may also be applied to displaying whether audio distortion is present at a transmitter on a display unit of a recording apparatus in a system where an audio signal is inputted into a recording apparatus (such as a VTR) that does not have an image pickup function but records images and audio or a dedicated audio recording apparatus.

It should be understood by those skilled in the art that various modifications, combinations, sub-combinations and alterations may occur depending on design requirements and other factors insofar as they are within the scope of the appended claims or the equivalents thereof.

What is claimed is:

1. A wireless audio transfer system comprising:

an audio transmitting apparatus including a microphone and a modulating/transmitting unit for transmitting radio waves modulated using an audio signal from the microphone;

an audio receiving apparatus including a receiving/demodulating unit for receiving the radio waves transmitted from the audio transmitting apparatus and demodulating the audio signal and an audio output terminal for outputting the audio signal demodulated by the receiving/demodulating unit; and an image pickup apparatus including an audio input terminal for inputting the audio signal outputted from the audio receiving apparatus, wherein the audio transmitting apparatus further includes a detecting unit for detecting distortion of an audio signal and a data transmitting unit for transmitting, as radio waves, distortion status data showing a detection result of the detecting unit, the audio receiving apparatus further includes a first communication terminal and a data processing unit for obtaining the distortion status data from the received radio waves and outputting the distortion status data from the first communication terminal, and the image pickup apparatus includes a second communication terminal for inputting the distortion status data outputted from the first communication terminal of the audio receiving apparatus, a display unit, and a first control unit for displaying, based on the distortion status data inputted into the second communication terminal, whether audio distortion is present at the audio transmitting apparatus on the display unit, wherein the distortion status data is included in a packet signal that is appended to the audio signal or the distortion status data is transmitted as a subcarrier of a different frequency band to a main carrier, the main carrier being radio waves used to transmit the audio signal.

2. A wireless audio transfer system according to claim 1, wherein the image pickup apparatus further includes a first wireless communication interface and operating unit for changing an input level of the audio signal into the audio transmitting apparatus, the first control unit of the image pickup apparatus is operable to transmit, in response to an operation of the an operating unit, control data showing the operation from the first wireless communication interface, and the audio transmitting apparatus further includes:

a second wireless communication interface for receiving control data transmitted from the first wireless communication interface of the image pickup apparatus;

a level adjusting unit for adjusting an input level of the audio signal from the microphone; and a second control unit for controlling the level adjusting unit based on the control data received by the second wireless communication interface.

3. A wireless audio transfer system according to claim 2, wherein in response to an operation of the operating unit, the first control unit of the image pickup apparatus transmits control data showing the operation from the first wireless communication interface and also carries out control to raise a level of the audio signal inputted from the audio receiving apparatus into the image pickup apparatus in response to an operation of the operating unit that lowers an input level of the audio signal into the audio transmitting apparatus having been carried out.

4. A wireless audio transfer system according to claim 1, wherein the image pickup apparatus further includes an operating unit for changing an input level of the audio signal into the audio transmitting apparatus, the first control unit of the image pickup apparatus is operable to output, in response to an operation of the operating unit, control data showing the operation from the second communication terminal to the audio receiving apparatus, the audio receiving apparatus further includes a first wireless communication interface and a second control unit for transmitting the control data inputted from the image pickup apparatus from the first wireless communication interface, and the audio transmitting apparatus further includes:

a second wireless communication interface for receiving the control data transmitted from the first wireless communication interface of the audio receiving apparatus;

a level adjusting unit for adjusting an input level of the audio signal from the microphone; and a third control unit for controlling the level adjusting unit based on the control data received by the second wireless transmitting interface.

5. A wireless audio transfer system comprising:

an audio transmitting apparatus including a microphone and a modulating/transmitting unit for transmitting radio waves modulated using an audio signal from the microphone;

an audio receiving apparatus including a receiving/demodulating unit for receiving the radio waves transmitted from the audio transmitting apparatus and demodulating the audio signal and an audio output terminal for outputting the audio signal demodulated by the receiving/demodulating unit; and a recording apparatus including an audio input terminal for inputting the audio signal outputted from the audio receiving apparatus, wherein the audio transmitting apparatus further includes a detecting unit for detecting distortion of an audio signal and a data transmitting unit for transmitting, as radio waves, distortion status data showing a detection result of the detecting unit, the audio receiving apparatus further includes a first communication terminal and a data processing unit for obtaining the distortion status data from the received radio waves and outputting the distortion status data from the first communication terminal, and the recording apparatus includes a second communication terminal for inputting the distortion status data outputted from the first communication terminal of the audio receiving apparatus, a display unit, and a first control unit for displaying, based on the distortion status data inputted into the second communication terminal, whether audio distortion is present at the audio transmitting apparatus on the display unit, wherein the distortion status data is included in a packet signal that is appended to the audio signal or the distortion status data is transmitted as a subcarrier of a different frequency band to a main carrier, the main carrier being radio waves used to transmit the audio signal.

6. A wireless audio transfer system according to claim 5, wherein the recording apparatus further includes a first wireless communication interface and an operating unit for changing an input level of the audio signal into the audio transmitting apparatus, the first control unit of the recording apparatus is operable to transmit, in response to an operation of the operating unit, control data showing the operation from the first wireless communication interface, and the audio transmitting apparatus further includes:

a second wireless communication interface for receiving control data transmitted from the first wireless communication interface of the recording apparatus;

a level adjusting unit for adjusting an input level of the audio signal from the microphone; and a second control unit for controlling the level adjusting unit based on the control data received by the second wireless communication interface.

7. A wireless audio transfer system according to claim 6, wherein in response to an operation of the operating unit, the first control unit of the recording apparatus transmits control data showing the operation from the first wireless communication interface and also carries out control to raise a level of the audio signal inputted from the audio receiving apparatus into the recording apparatus in response to an operation of the operating unit that lowers an input level of the audio signal into the audio transmitting apparatus having been carried out.

8. A wireless audio transfer system according to claim 5, wherein the recording apparatus further includes an operating unit for changing an input level of the audio signal into the audio transmitting apparatus, the control unit of the recording apparatus is operable to output, in response to an operation of the operating unit, control data showing the operation from the second communication terminal to the audio receiving apparatus, the audio receiving apparatus further includes a first wireless communication interface and a second control unit for transmitting the control data inputted from the recording apparatus from the first wireless communication interface, and the audio transmitting apparatus further includes:

a second wireless communication interface for receiving the control data transmitted from the first wireless communication interface of the audio receiving apparatus;

a level adjusting unit for adjusting an input level of the audio signal from the microphone; and a third control unit for controlling the level adjusting unit based on the control data received by the second wireless transmitting interface.

9. A wireless audio transfer system comprising:

an audio transmitting apparatus including a microphone and a modulating/transmitting unit for transmitting radio waves modulated using an audio signal from the microphone;

an audio receiving apparatus including a receiving/demodulating unit for receiving the radio waves transmitted from the audio transmitting apparatus and demodulating the audio signal and an audio output terminal for outputting the audio signal demodulated by the receiving/demodulating unit; and an audio mixer including an audio input terminal for inputting the audio signal outputted from the audio receiving apparatus, wherein the audio transmitting apparatus further includes a detecting unit for detecting distortion of an audio signal and a data transmitting unit for transmitting, as radio waves, distortion status data showing a detection result of the detecting unit, the audio receiving apparatus further includes a first communication terminal and a data processing unit for obtaining the distortion status data from the received radio waves and outputting the distortion status data from the first communication terminal, and the audio mixer includes a second communication terminal for inputting the distortion status data outputted from the first communication terminal of the audio receiving apparatus, a display unit, and a first control unit for displaying, based on the distortion status data inputted into the second communication terminal, whether audio distortion is present at the audio transmitting apparatus on the display unit, wherein the distortion status data is included in a packet signal that is appended to the audio signal or the distortion status data is transmitted as a subcarrier of a different frequency band to a main carrier, the main carrier being radio waves used to transmit the audio signal.

10. A wireless audio transfer system according to claim 9, wherein the audio mixer further includes a first wireless communication interface and an operating unit for changing an input level of the audio signal into the audio transmitting apparatus, the first control unit of the audio mixer is operable to transmit, in response to an operation of the operating unit, control data showing the operation from the first wireless communication interface, and the audio transmitting apparatus further includes:

a second wireless communication interface for receiving control data transmitted from the first wireless communication interface of the audio mixer;

a level adjusting unit for adjusting an input level of the audio signal from the microphone; and a second control unit for controlling the level adjusting unit based on the control data received by the second wireless communication interface.

11. A wireless audio transfer system according to claim 10, wherein in response to an operation of the operating unit, the first control unit of the audio mixer transmits control data showing the operation from the first wireless communication interface and also carries out control to raise a level of the audio signal inputted from the audio receiving apparatus into the audio mixer apparatus in response to an operation of the operating unit that lowers an input level of the audio signal into the audio transmitting apparatus having been carried out.

12. A wireless audio transfer system according to claim 9, wherein the audio mixer further includes an operating unit for changing an input level of the audio signal into the audio transmitting apparatus, the control unit of the audio mixer is operable to output, in response to an operation of the operating unit, control data showing the operation from the second communication terminal to the audio receiving apparatus, the audio receiving apparatus further includes a first wireless communication interface and a second control unit for transmitting the control data inputted from the audio mixer from the first wireless communication interface, and the audio transmitting apparatus further includes:

a second wireless communication interface for receiving the control data transmitted from the first wireless communication interface of the audio receiving apparatus;

a level adjusting unit for adjusting an input level of the audio signal from the microphone; and a third control unit for controlling the level adjusting unit based on the control data received by the second wireless transmitting interface.

13. A wireless audio transfer system comprising:

a plurality of audio transmitting apparatuses that each include a microphone and a modulating/transmitting unit for transmitting radio waves modulated using an audio signal from the microphone;

at least one audio receiving apparatus including a receiving/demodulating unit for receiving the radio waves transmitted from at least one audio transmitting apparatus out of the plurality of audio transmitting apparatuses and demodulating the audio signals and at least one audio output terminal for outputting the audio signals demodulated by the receiving/demodulating unit; and a terminal apparatus connected to the at least one audio receiving apparatus, wherein each audio transmitting apparatus further includes a detecting unit for detecting distortion of an audio signal and a data transmitting unit for transmitting, as radio waves, distortion status data showing a detection result of the detecting unit, each audio receiving apparatus further includes a data processing unit for obtaining the distortion status data from the radio waves respectively received from the audio transmitting apparatuses and transmitting the distortion status data to the terminal apparatus, and the terminal apparatus includes a display unit and a control unit for displaying a list of the distortion status data of the audio transmitting apparatuses transmitted from the at least one audio receiving apparatus on the display unit, wherein the distortion status data is included in a packet signal that is appended to the audio signal or the distortion status data is transmitted as a subcarrier of a different frequency band to a main carrier, the main carrier being radio waves used to transmit the audio signal.

14. A wireless microphone comprising:

an audio transmitting apparatus including a microphone and a modulating/transmitting unit for transmitting radio waves modulated using an audio signal from the microphone, wherein an audio receiving apparatus including a receiving/demodulating unit receives the radio waves transmitted from the audio transmitting apparatus and demodulates the audio signal and an audio output terminal for outputs the audio signal demodulated by the receiving/demodulating unit, wherein the audio transmitting apparatus further includes a detecting unit for detecting distortion of an audio signal and a data transmitting unit for transmitting, as radio waves, distortion status data showing a detection result of the detecting unit, and the audio receiving apparatus further includes a communication terminal and a data processing unit for obtaining the distortion status data from the received radio waves and outputting the distortion status data from the communication terminal, wherein the distortion status data is included in a packet signal that is appended to the audio signal or the distortion status data is transmitted as a subcarrier of a different frequency band to a main carrier, the main carrier being radio waves used to transmit the audio signal.

15. A wireless microphone according to claim 14, wherein the audio transmitting apparatus further includes:

a wireless communication interface;

a level adjusting unit for adjusting an input level of the audio signal from the microphone; and a control unit operable to control, in response to the wireless communication interface receiving control data for changing the input level of the audio signal, the level adjusting unit based on the control data.

16. A wireless microphone according to claim 14, wherein the audio receiving apparatus further includes a first wireless communication interface, an operating unit for changing an input level of the audio signal into the audio transmitting apparatus, and a control unit for transmitting control data showing an operation of the operating unit from the first wireless communication interface, and the audio transmitting apparatus further includes:

a second wireless communication interface for receiving data transmitted from the first wireless communication interface of the audio receiving apparatus;

a level adjusting unit for adjusting an input level of the audio signal from the microphone; and a control unit for controlling the level adjusting unit based on the control data received by the second wireless communication interface.

* * * * *